United States Patent
Bond et al.

(10) Patent No.: US 11,922,636 B2
(45) Date of Patent: Mar. 5, 2024

(54) PLACING AUGMENTED REALITY OBJECTS IN AN IMAGE BASED ON DEVICE POSITION

(71) Applicant: GOOGLE LLC, Mountain View, CA (US)

(72) Inventors: David Bond, Mountain View, CA (US); Mark Dochtermann, Sherman Oaks, CA (US)

(73) Assignee: GOOGLE LLC, Mountain View, CA (US)

( * ) Notice: Subject to any disclaimer, the term of this patent is extended or adjusted under 35 U.S.C. 154(b) by 434 days.

(21) Appl. No.: 17/283,688

(22) PCT Filed: Oct. 9, 2019

(86) PCT No.: PCT/US2019/055398
§ 371 (c)(1),
(2) Date: Apr. 8, 2021

(87) PCT Pub. No.: WO2020/076952
PCT Pub. Date: Apr. 16, 2020

(65) Prior Publication Data
US 2022/0012896 A1    Jan. 13, 2022

Related U.S. Application Data

(60) Provisional application No. 62/742,992, filed on Oct. 9, 2018.

(51) Int. Cl.
*G06T 7/20* (2017.01)
*G01P 15/00* (2006.01)
(Continued)

(52) U.S. Cl.
CPC ............... *G06T 7/20* (2013.01); *G01P 15/00* (2013.01); *G06T 7/194* (2017.01); *G06T 7/70* (2017.01);
(Continued)

(58) Field of Classification Search
CPC ......... G06T 19/006; G06T 7/194; G06T 7/70; G06T 11/00; G06T 7/20;
(Continued)

(56) References Cited

U.S. PATENT DOCUMENTS 9,894,298 B1 *  2/2018  Solh ....................... H04N 23/63
10,607,567 B1 *  3/2020  Schritter ................. G09G 5/06
(Continued)

OTHER PUBLICATIONS

XP055292259 Aron et al: "Use of Inertial Sensors to Support Video Tracking", Computer Animation and Virtual Worlds, 2007, ISSN : 1546-4261, DOI: 10.1002/cav.161, p. 29.
(Continued)

*Primary Examiner* — Congvan Tran (57) ABSTRACT

An electronic device places an augmented reality object in an image of a real environment based on a pose of the electronic device and based on image segmentation. The electronic device includes a camera that captures images of the real environment and sensors, such as an inertial measurement unit (IMU), that capture a pose of the electronic device. The electronic device selects an augmented reality (AR) object from a memory, segments a captured image of the real environment into foreground pixels and background pixels, and composites an image for display wherein the AR object is placed between the foreground pixels and the background pixels. As the pose of the electronic device changes, the electronic device maintains the relative position of the AR object with respect to the real environment in images for display.

20 Claims, 4 Drawing Sheets

(51) Int. Cl.
  *G06T 7/194* (2017.01)
  *G06T 7/70* (2017.01)
  *G06T 11/00* (2006.01)
  *G06T 19/00* (2011.01)
  *G06V 40/16* (2022.01)
(52) U.S. Cl.
  CPC ............ *G06T 11/00* (2013.01); *G06T 19/006* (2013.01); *G06V 40/16* (2022.01)
(58) Field of Classification Search
  CPC .......... G06T 2207/10016; G06T 2207/30201; G06V 40/16; G01P 15/00
  See application file for complete search history.

(56) References Cited

U.S. PATENT DOCUMENTS

| | | | |
|---|---|---|---|
| 10,817,983 B1* | 10/2020 | Da Silva Quelhas | G06T 15/503 |
| 2011/0320042 A1* | 12/2011 | Handelman | B25J 5/005 382/153 |
| 2017/0102772 A1 | 4/2017 | Hesch et al. | |
| 2017/0343809 A1* | 11/2017 | Benesh | G09G 5/00 |
| 2018/0082117 A1 | 3/2018 | Sharma | |
| 2018/0126553 A1* | 5/2018 | Corkum | B25J 9/1697 |
| 2018/0352248 A1* | 12/2018 | Nishi | H04N 19/513 |
| 2019/0028637 A1* | 1/2019 | Kolesov | H04N 23/63 |
| 2019/0035100 A1* | 1/2019 | Ebrahimi Afrouzi | G01S 17/86 |
| 2019/0187784 A1* | 6/2019 | Erivantcev | G06F 1/1694 |

OTHER PUBLICATIONS

XP002685272 Tian et al: "Real-Time Occlusion Handling in Augmented Reality Based on Object Tracking Approach", Sensors, MDPI AG, 2010, ISSN: 1424-8220, DOI: 10.3390/S100402885, pp. 16.

International Search Report and Written Opinion dated Dec. 10, 2019 for corresponding International Application No. PCT/US2019/055398, 15 pages.

International Preliminary Report on Patentability dated Apr. 22, 2021 for PCT/US2019/055398, 8 pages.

* cited by examiner

PLACING AUGMENTED REALITY OBJECTS IN AN IMAGE BASED ON DEVICE POSITION

CROSS-REFERENCE TO RELATED APPLICATIONS

The present application is a U.S. National Stage Application under 35 U.S.C. § 371 of International Patent Application Serial No. PCT/US2019/055398, entitled "PLACING AUGMENTED REALITY OBJECTS IN AN IMAGE BASED ON DEVICE POSITION" and filed on Oct. 9, 2019, which claims priority to U.S. Provisional Application No. 62/742,992, entitled "PLACING AUGMENTED REALITY OBJECTS IN AN IMAGE BASED ON DEVICE POSITION" and filed on Oct. 9, 2018, the entireties of which are incorporated by reference herein.

BACKGROUND

The present disclosure relates generally to computer devices and more particularly to augmented and virtual reality for computer devices.

DESCRIPTION OF THE RELATED ART

Augmented and virtual reality applications have become increasingly sophisticated as processors and other computing modules have grown more capable. Virtual reality applications present, via a display device such as a head mounted display, a virtual environment to a user, and in some cases allow the user to interact with the virtual environment. Augmented reality applications, in contrast, merge virtual objects (referred to herein as "augmented reality objects") with images of the real environment of the user. Augmented reality applications therefore present the challenge of merging the augmented reality objects with the images of the real environment in a way that provides a satisfactory user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for placing an augmented reality object in an image or video stream of images of a real environment based on a pose of an electronic device and based on image segmentation in accordance with some embodiments. The electronic device includes a camera that captures images of the real environment and sensors, such as an inertial measurement unit (IMU) that captures a pose (position and orientation) of the electronic device. Based on predefined or programmable criteria, the electronic device selects an augmented reality (AR) object from a memory. The electronic device segments a captured image of the real environment into foreground pixels and background pixels and composites an image for display wherein the AR object is placed between the foreground pixels and the background pixels. Further, as the pose of the electronic device changes, the electronic device maintains the relative position of the AR object with respect to the real environment in images for display. Using these techniques, the AR object is more immersively placed in the display images, improving the user experience.

To illustrate via an example, in some embodiments the captured image is a "selfie" image or "selfie" video that captures an image or series of images (video) of the user of the electronic device in a foreground of the image. The AR object is an image of a well-known character from a popular movie or television show. The electronic device is configured to segment the captured image so that the portion of the image displaying the user is identified as foreground pixels, and the background of the image (the visual aspects behind the user) is identified as background pixels. The electronic device composites the display image so that the AR character is placed between the foreground pixels displaying the image of the user and the background pixels including the image background, thereby enhancing the impression that the user and the character are both present in the displayed environment. Further, as the user moves the electronic device and continues to capture images, the electronic device adjusts the pose of the displayed AR character in the display image, so that the relative pose of the AR character is fixed, thereby further enhancing the impression that the AR character is present in the displayed environment.

In some embodiments, the electronic device may temporarily lose track of the device pose. In response, the electronic device temporarily locks the pose of the electronic device and the corresponding pose of the AR character. Upon recovering tracking of the device pose, the electronic device identifies a new corresponding pose for the AR character. The electronic device interpolates intermediate poses between the locked pose and the new pose and display the AR object over successive images using the interpolated poses. The electronic device thereby prevents the AR object from "jumping" around the display images in a distracting manner, thus improving the user experience.

Figure 1:
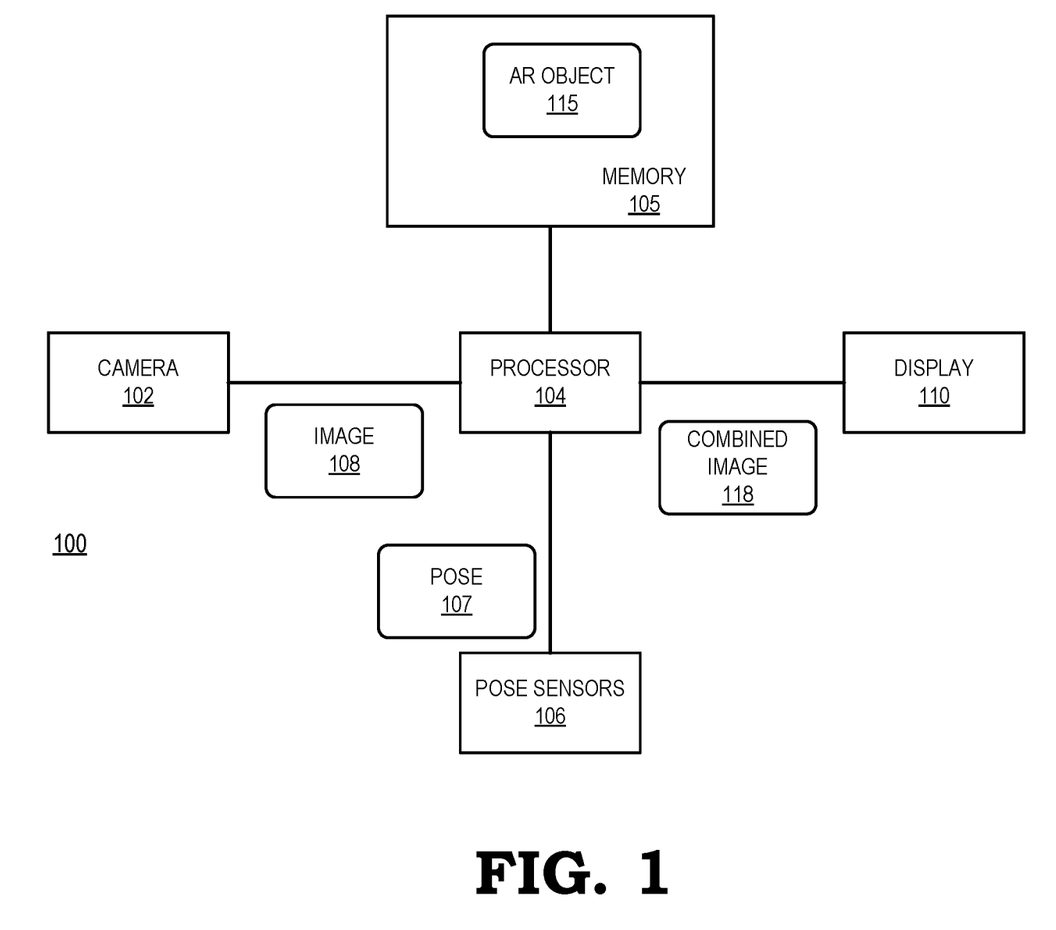
FIG. 1 is a block diagram of an electronic device that places an augmented reality object in an image of a real environment based on a pose of the electronic device and based on image segmentation in accordance with some embodiments.

FIG. 1 illustrates a block diagram of an electronic device 100 that places an augmented reality object in an image of a real environment based on a pose of the electronic device and based on image segmentation in accordance with some embodiments. The electronic device 100 can be any device capable of generating or displaying AR content, including a desktop or laptop computer, a smartphone, a tablet, a gaming console, and the like. For purposes of describing the example embodiment of FIG. 1, it is assumed that the electronic device 100 is a smartphone.

To support display of AR content, the electronic device 100 includes a camera 102, a processor 104, a memory 105, and a display 110. The camera 102 is, in at least one embodiment, a digital camera including one or more image sensors that collectively capture images (e.g., image 108) of a real environment of the electronic device 100. The real environment refers to objects that are actually present in the area surrounding the electronic device and capable of detection by the one or more image sensors. The processor 104 is a general-purpose or application-specific processor generally configured to execute sets of instructions (e.g., applications) to carry out specified tasks for the electronic device 100 as described further herein. The display 110 is a display device (e.g., a display screen) generally configured to display images to a user of the electronic device 100.

The electronic device 100 includes pose sensors 106 that include one or more sensors configured to collectively generate pose data (also referred to as pose information), referred to as poses (e.g., pose 107) reflecting a position, orientation, or combination thereof, of the electronic device 100. In at least one embodiment, the pose sensors 106 include an inertial measurement unit (IMU) including one or more gyroscopes, magnetometers, and accelerometers. In some embodiments, the pose sensors 106 can be employed to generate pose information along multiple axes of motion, including translational axes, expressed as X, Y, and Z axes of a frame of reference for the electronic device 100, and rotational axes, expressed as roll, pitch, and yaw axes of the frame of reference for the electronic device 100. Thus, the pose sensors generate information indicating the estimated position of the electronic device 100 along each of the six axes in a frame of reference, reflecting six degrees-of-freedom (6DoF) of the electronic device 100, such as X, Y, and Z translational axes and roll, pitch, and yaw rotational axes. The pose sensors 106 can include other or additional pose sensors, such as a global positioning satellite (GPS) sensor, or other sensors that can be used to identify a location of the electronic device 100, such as one or more wireless radios, cellular radios, and the like.

In at least one embodiment, the pose sensors 106 can also include a simultaneous localization and mapping (SLAM) module that generates a map of the environment of the electronic device 100 based on objects or features identified in images captured by the camera 102. The SLAM module identifies the objects or features according to conventional machine vision techniques and compares the objects to an object store (not shown) stored at the electronic device 100 or at a remote server that communicates with the electronic device 100 via a network (e.g. via the Internet). The locations of the objects or features in the object store are known, such that the SLAM module can generate the environment map based on the object or feature comparison and matching. Thus, the poses generated by the pose sensors 106 can be based on a combination of sensors, such as a combination of IMU data and SLAM mapping information.

The memory 105 is computer memory, such as random-access memory (RAM), flash memory, or a combination thereof, configured to store data for access by the processor 104. In the example of FIG. 1, the memory 105 stores AR objects (e.g. AR object 115), sometimes referred to as "stickers", for display via the display 110. Examples of AR objects can include figure images (e.g., images of characters from movies, television shows, musicians, and the like), three-dimensional (3D) animated images, emojis, cartoon characters, weather images, and the like.

In operation, the processor 104 combines images captured by the camera 108 with one or more AR objects to generate combined images (e.g., combined image 118) and displays the combined image at the display 110. In some embodiments, the processor 104 generates a combined image by segmenting the captured image into foreground pixels and background pixels. To segment the image, the processor 104 can apply any image segmentation method, or a combination thereof, including pixel thresholding, data clustering, motion and interactive segmentation, compression-based segmentation, histogram based segmentation, edge detection, dual clustering, region-growing, partial differential equation segmentation (e.g., parametric, level set, or fast marching), variational segmentation, watershed transformation, model-based segmentation, multi-scale segmentation, semi-automatic segmentation, trainable segmentation, multispectral segmentation, and the like. For example, in at least one embodiment the processor 104 employs segmentation or other object identification techniques to identify one or more figures in a foreground of a captured image (e.g., image 108), such as the figure of the user in a self-picture ("selfie"). The processor 104 identifies pixels representing the identified figures as foreground pixels and identifies all other pixels of the captured image as background pixels.

Figure 2:
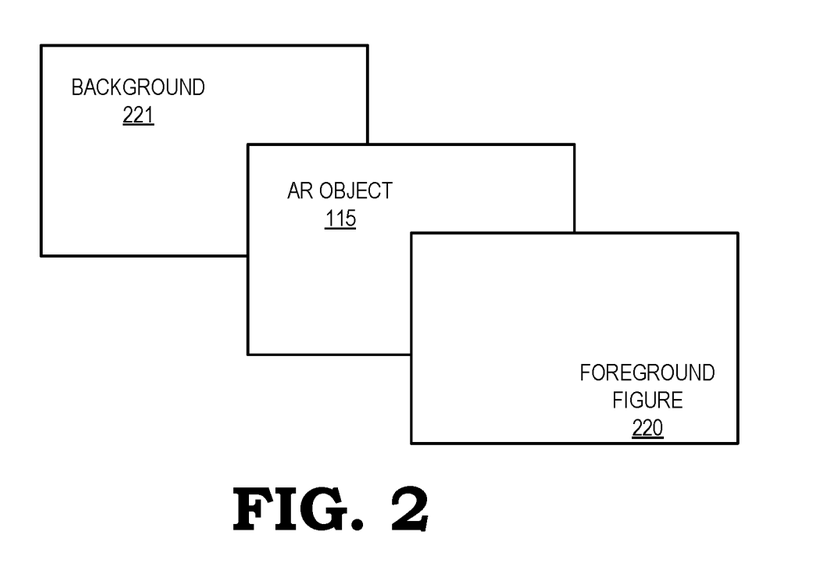
FIG. 2 is a block diagram illustrating an example of the electronic device of FIG. 1 placing the augmented reality object between a background and a foreground object based on image segmentation in accordance with some embodiments.

In some embodiments, after identifying the foreground and background pixels, the processor 104 generates a combined image for display (e.g., combined image 118) as follows: the processor 104 renders the entire captured image (both the background and foreground pixels). The processor 104 then renders the AR object 115 over the rendered captured image. The processor 104 then renders the identified foreground pixels over the AR object 115, occluding at least a portion of the AR object 115. An example is illustrated at FIG. 2. In the illustrated example, the combined image includes a foreground FIG. 220 that partially occludes the AR object 115, which in turn is rendered over a background 221. The AR object 115 is therefore positioned between the background pixels of the background 221 and the foreground pixels of the foreground FIG. 220. The AR object 115 thus appears to be more integrated into the overall image. For example, the AR object 115 may be a character that, upon rendering, appears to be standing with and slightly behind the user of the electronic device 100.

Returning to FIG. 1, in some embodiments the processor 104 uses the pose information (e.g., pose 107) to place the AR object 115 in one or more combined images. For example, in some embodiments, upon initiation of an AR application the processor 104 creates a frame of reference or other virtual environment (not shown) to model the real environment of the electronic device 100. Upon generation of an initial combined image, the processor 104 identifies the corresponding initial pose of the electronic device 100 and identifies an initial relationship between the initial pose of the electronic device 100 and a pose of the AR object 115 in the virtual environment. The initial relationship can reflect a relative position, orientation, or combination thereof, and is reflected by the placement of the AR object 115 in the initial combined image.

As the user moves around the real environment and captures additional images at the camera 102 (e.g., capturing a video stream at the camera 102) and the pose sensors 106 generate additional pose data, the processor 104 generates additional corresponding combined images. For each combined image after the initial combined image, the processor 104 identifies (based on pose information provided by the pose sensors 106 during a current period of time) a current pose of the electronic device 100. The processor 104 identifies a transformation between the current pose and the initial pose, or between the current pose and the most recent previous pose based on pose information provided by the pose sensors during a corresponding previous period of time. For example, the processor 104 may identify that the current pose differs from the most recent previous pose by a distance d in the y direction with a rotation of θ. Based on the identified transformation, the processor 104 applies a corresponding transformation to the initial or most recent pose of the AR object 115 in the virtual environment to identify a current pose for the AR object 115. When rendering the AR object 115 in the corresponding combined image, the processor 104 renders the AR object 115 at a position in the combined image corresponding to the identified current pose for the AR object 115. The AR object 115 thereby appears to maintain the same real-environment position as the electronic device 100 moves or rotates, thereby improving the user experience.

In some embodiments, the pose sensors 106 may temporarily lose track of the pose of the electronic device 100 because of SLAM tracking errors, IMU errors, and the like, or a combination thereof. Such loss of tracking can cause the AR object 115 to "jump" locations in successive combined images displayed at the display 100, resulting in a poor user experience. Accordingly, in some embodiments the processor 104 gradually adjusts the pose of the AR object 115 in the virtual environment in response to loss of pose tracking of the electronic device 100. For example, in some embodiments the processor 104 adjusts the pose of the AR object 115 as follows: in response to identifying that pose tracking is lost (enters PAUSED state) the processor 104 locks the pose of the electronic device 100 the most recent previous unpaused pose (the "locked_pose"). When pose tracking is regained (enters TRACKING state) the processor 104 continues keeping the pose of the electronic device 100 locked to locked_pose until tracking has been continuously present for a threshold period of N seconds (e.g. 3 seconds). This prevents tracking from bouncing rapidly between on and off. After the N seconds is up, the processor 104 sets the pose of the AR object 115 such that it is in the same location relative to the current pose of the electronic device as it was to locked_pose. There can often be a large discrepancy (translation and rotation) between the current pose and locked_pose, so locking the pose of the electronic device 100 until tracking has reliably resumed and setting the pose of the AR object 115 in the same location relative to the current pose of the electronic device 100 as it was to the locked-pose minimizes noticeable popping or sliding of the sticker.

In response to detecting that the pose sensors 106 have lost pose tracking based on feature identification and matching (6DoF pose tracking), in some embodiments, the processor 104 sets the pose of the AR object 115 based on pose sensor data generated by accelerometers of the electronic device 100 (i.e., data indicative of three degrees of freedom (3DoF)), without relying on 6DoF feature identification and matching. 3DoF pose tracking is generally more robust than 6DoF pose tracking and can indicate which direction is up (based on gravity), even when 6DoF pose tracking has been lost. Therefore, the electronic device 100 relies on 3DoF pose tracking to orient the AR object 115 when 6DoF pose tracking has been lost or is marginal.

In some embodiments, during tracking the processor 104 limits the rate of pose translation of the electronic device 100 to a threshold velocity P (e.g. 1.2 meters/second), and the rate of pose rotation of the electronic device 100 to a threshold rotation Q (e.g., 90 degrees/second). Under marginal tracking conditions, the electronic device pose will sometimes make a large instantaneous translation (i.e., a "pop"), even after the N seconds in locked_pose. By limiting the pose translation and rotation, the change in pose creates a less noticeable slide and an improved user experience.

In some embodiments, the processor 104 updates the pose of the AR object 115 periodically, such as every M seconds (e.g. every 2 seconds). In some embodiments, the processor 104 updates the pose of the AR object 115 less frequently when the electronic device 100 is set to the locked_pose than when tracking is active. In some embodiments, the processor 104 identifies one or more faces in the captured image and selects a target AR object pose based on the position of the largest face in the captured image. For example, the processor 104 positions the AR object 115 proximate to the largest face in the captured image. In some embodiments, the processor 104 identifies the two largest faces in the captured image and selects a target AR object pose based on the positions of the two largest faces in the captured image. For example, the processor 104 positions the AR object 115 between the two largest faces in the captured image. The processor 104 updates the pose of the AR object 115 by interpolating the most recent previous pose of the AR object 115 to a new (i.e., current) pose over a predetermined time period, such as R seconds (e.g. over a 1-second interval). In some embodiments, the processor 104 moves the AR object 115 from the most recent previous pose to the current pose at a non-uniform velocity (i.e., with an ease-in/ease-out). For example, the processor 104 accelerates the AR object 115 from an initial pose (i.e., the most recent previous pose) toward the current (updated) pose and decelerates the AR object 115 as the AR object 115 approaches the updated pose. In some embodiments, the processor 104 updates the pose of the AR object 115 more frequently when the electronic device pose is set to the locked_pose (e.g., at 1-second intervals instead of 2-second intervals) because there is no pose tracking, so keeping the pose of the AR object 115 always updating makes it appear less like the AR object 115 pose is locked to the camera.

Figure 3:
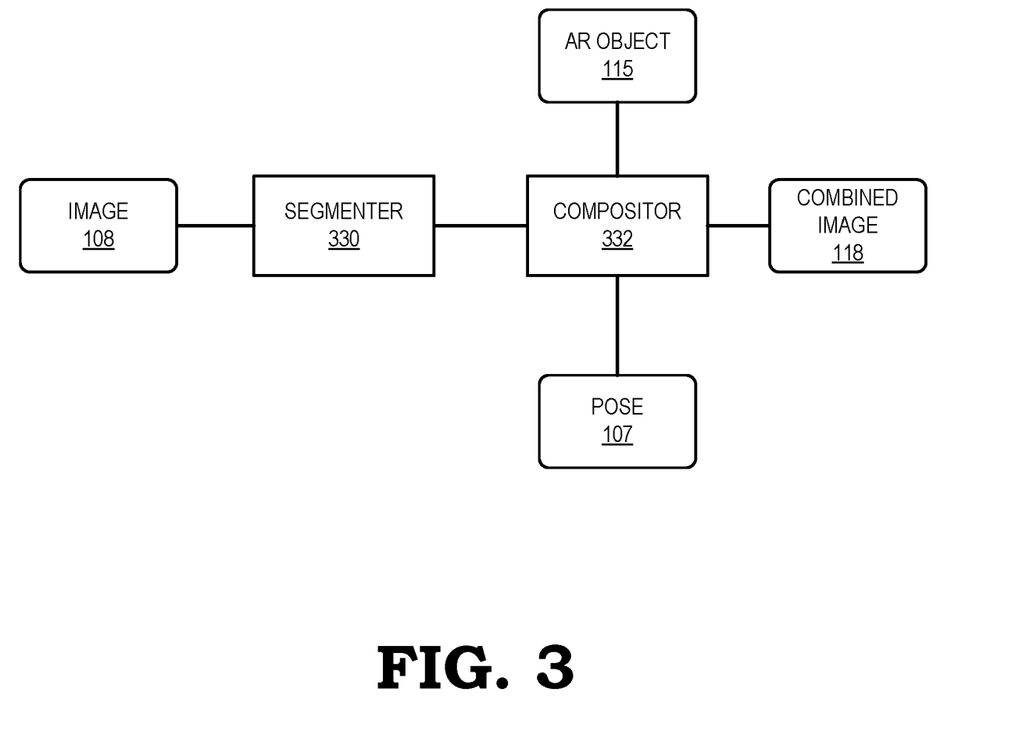
FIG. 3 is a block diagram of aspects of the processor of the electronic device of FIG. 1 that support placement of the augmented reality object in the image of the real environment in accordance with some embodiments.

FIG. 3 is a block diagram of aspects of the processor of the electronic device 100 of FIG. 1 that support placement of the augmented reality object in the image of the real environment in accordance with some embodiments. In the depicted example, the processor 104 implements a segmenter 330 and a compositor 332. The segmenter 330 is generally configured to segment the image 108 into foreground and background pixels as described above with respect to FIG. 1. The compositor 332 is configured to composite the foreground and background pixels with the AR object 115, based on the pose 107, to generate the combined image 118. The segmenter 330 and the compositor 332 may be implemented as hard-coded logic, programmable logic, software executed by the processor 104, or a combination thereof. In some embodiments, the compositor 332 identifies a pose of the AR object 115 based on the pose 107, as described above, and then identifies a position and orientation of the AR object 115 in the combined image 118 based on the identified pose. The compositor 332 renders the image 108, renders the AR object 115 over the rendered image at the identified position and orientation, and then renders the foreground pixels (as identified by the segmenter 330) over the rendered image and the rendered AR object 115, to generate the combined image 118.

Figure 4:
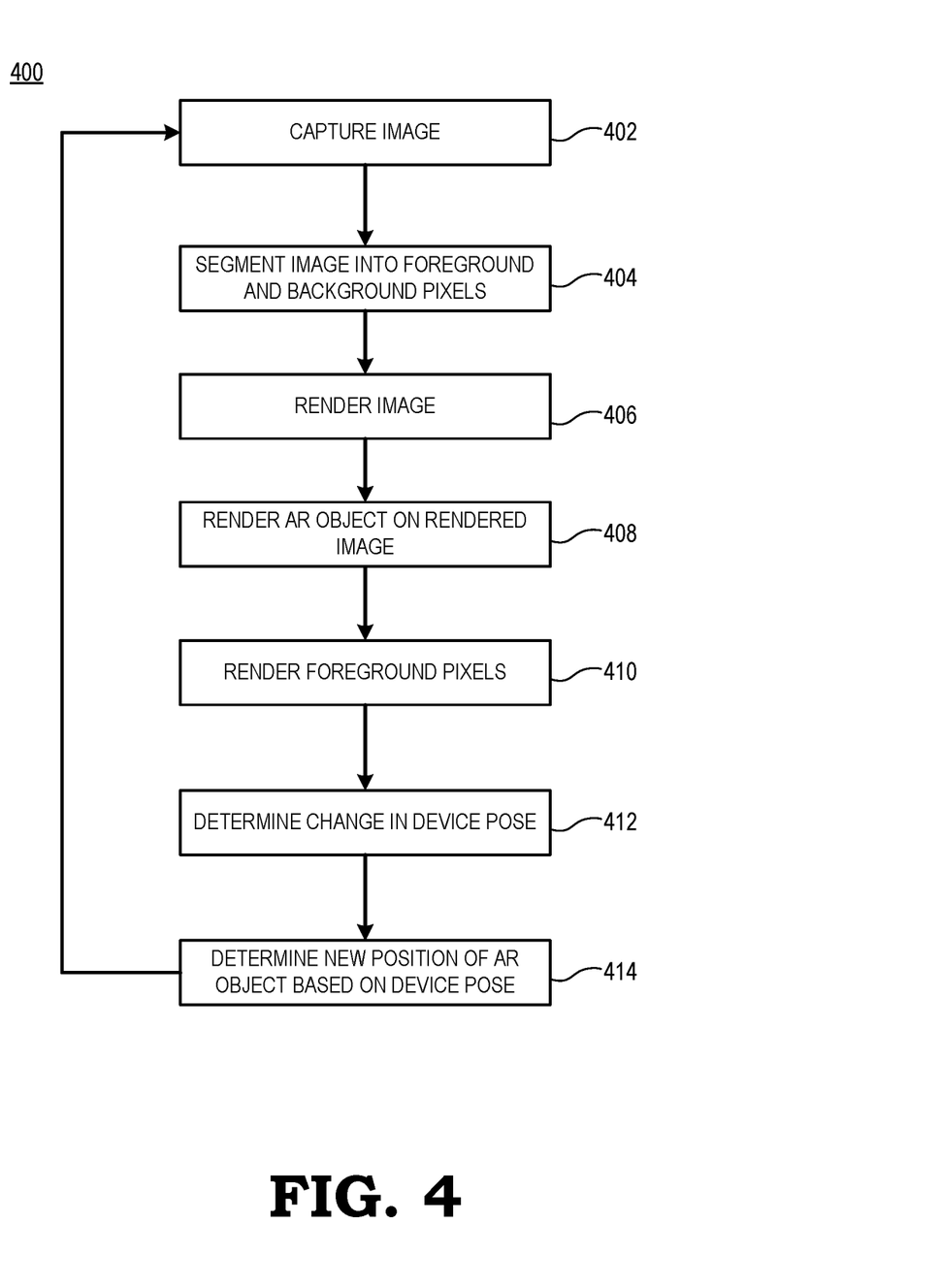
FIG. 4 is a flow diagram of a method of placing an augmented reality object in an image of a real environment based on a pose of an electronic device and based on image segmentation in accordance with some embodiments.

FIG. 4 is a flow diagram of a method 400 of placing an augmented reality object in an image of a real environment of an electronic device based on a pose of the electronic device and based on image segmentation in accordance with some embodiments. The method 400 is described with respect to an example implementation at the electronic device 100 of FIG. 1. At block 402, the camera 102 captures an image (e.g., image 108). At block 404 the segmenter 330 segments the captured image into foreground pixels and background pixels. At block 406 the compositor 332 renders the captured image (including both the foreground pixels and the background pixels). At block 408 the compositor 332 renders the AR object 115 on top of the rendered image. At block 410 the compositor 332 renders the foreground pixels identified by the segmenter 330 on top of the rendered image with the rendered AR object 115, obscuring at least a portion of the rendered AR object 115, thereby generating a combined image that is displayed at the display 110.

At block 412, the processor 104 determines, based on pose information generated by the pose sensors 106, a change in the pose of the electronic device 100. In response, at block 414 the processor 104 adjusts the pose of the AR object 115 based on the change in the pose of the electronic device 100, so that the AR object 115 maintains a similar pose, or the same pose, in displayed combined images relative to the pose of the electronic device 100. The method flow returns to block 402.

Figure 5:
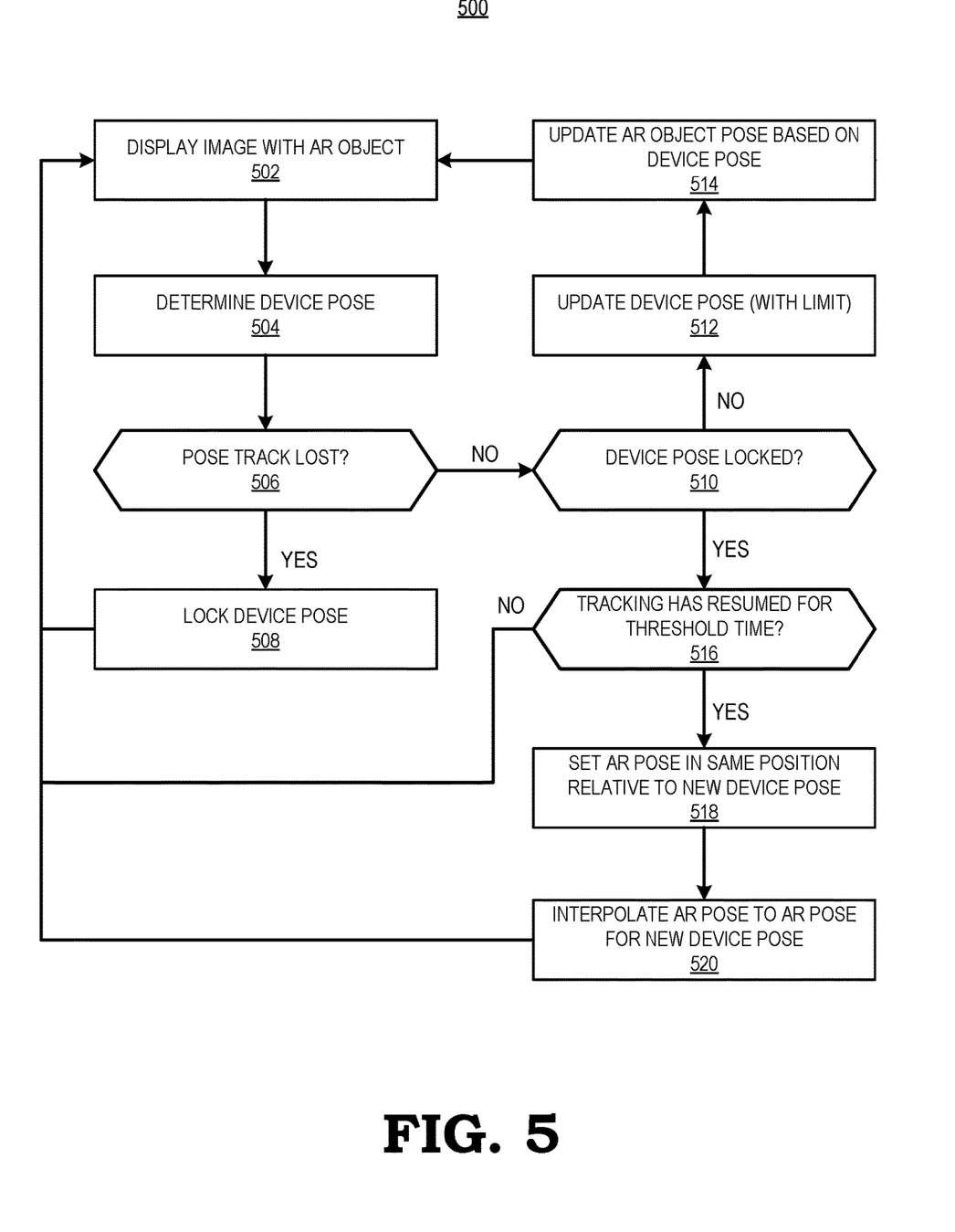
FIG. 5 is a flow diagram of a method of adjusting a pose of an augmented reality object in an image of a real environment in response to losing track of the pose of an electronic device in accordance with some embodiments.

FIG. 5 is a flow diagram of a method 500 of adjusting a pose of an augmented reality object in an image of a real environment in response to losing track of the pose of an electronic device in accordance with some embodiments. The method 500 is described with respect to an example implementation at the electronic device 100 of FIG. 1. At block 502, the electronic device 100 displays at the display 100 a combined image (e.g., combined image 118) including the AR object 115, as described above, based on a current pose of the AR object 115. At block 504 the processor 104 determines a current device pose for the electronic device 100 based on pose information provided by the pose sensors 106. At block 506 the processor 104 determines if a pose track for the electronic device 100 has been lost. In some embodiments, the processor 104 determines that the pose track has been lost in response to identifying large changes (changes above a threshold) in pose information provided by the pose sensors 106 in a short amount of time (an amount of time below a threshold). In response to determining that tracking for the electronic device 100 has been lost, the method flow proceeds to block 508 and the processor 104 locks the pose of the electronic device 100 to the most recent previous tracked pose (locked_pose). The method returns to block 502 where the electronic device 100 continues to display combined images with the pose of the device 100 in the locked pose, ensuring that the pose of the AR object 115 is also locked into its most recent pose, thereby preventing the AR object 115 from "jumping" or other distracting display discontinuities.

If, at block 506, the processor 104 determines that tracking for the electronic device 100 has not been lost, the method flow continues to block 510. At block 510, the processor 104 determines whether the pose of the electronic device 100 is locked. If, at block 510, the processor 104 determines that the pose of the electronic device 100 is not locked, the method flow continues to block 512. At block 512, the processor 104 updates the pose of the electronic device 104 based on pose information provided by the pose sensors 106. For example, the processor 104 can identify a transformation (translation, rotation, or combination thereof) between the current pose of the electronic device 100 and a previous pose of the electronic device 100. In some embodiments, the processor 104 limits the updates in the pose (both position and rotation) to specified limits (e.g. 1.2 meters/second and 90 degrees) to reduce the likelihood of the AR object 115 "popping" in the displayed combined images. The method continues to block 514, at which the processor 104 updates the pose of the AR object 115 by applying a corresponding transformation to a previous pose of the AR object 115 to determine the current pose of the AR object 115. The method returns to block 502 where the electronic device 100 displays another combined image with the AR object 115 based on the current pose of the AR object 115 as determined at block 514.

Returning to block 510, in response to determining that the pose for the electronic device 100 has been locked, the method flow proceeds to block 516 and the processor 104 determines whether tracking has resumed for at least a threshold amount of time. If tracking has not resumed for at least the threshold amount of time, the method flow continues back to block 502. Thus, even after pose tracking of the electronic device 100 has resumed, the processor 104 maintains the device pose in the locked pose until pose tracking has been maintained for the threshold amount of time, thereby preventing tracking from "bouncing" between tracking and non-tracking, which can cause distracting display artifacts in the displayed combined images.

If, at block 516, the processor 104 determines that tracking has resumed for at least the threshold amount of time, the method flow proceeds the block 518 and the processor 104 sets a target AR object pose based on the current pose of the electronic device 100. In some embodiments, the processor 104 updates the target AR object pose (based on the current pose of the electronic device 100) every X seconds when the processor 104 has a pose track for the electronic device 100, and more often (every Y seconds, where Y is less than X) when the processor 104 has lost the pose track and has locked the pose of the electronic device 100. At block 520, the processor 104 interpolates between the previous pose of the AR object 115 and the target AR object pose to determine the current AR object pose, until the target AR object pose matches the current AR object pose. The processor 104 thereby ensures smooth changes in the pose of the AR object 115 as displayed via the combined images, thus improving the user experience.

In other words, an example method comprises segmenting, by a processor 104 of an electronic device 100, an image 108 of a real environment of the electronic device captured by a camera 102 of the electronic device into foreground pixels and background pixels; combining, by the processor, the image with an augmented reality, AR, object 115 based on the segmenting to generate a combined image 118; and displaying, on a display 110 of the electronic device, the combined image.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   segmenting, at a processor of an electronic device, a first image of a real environment of the electronic device captured at a camera of the electronic device into foreground pixels and background pixels;
   combining, at the processor, the first image with an augmented reality (AR) object based on the segmenting to generate a first combined image;
   identifying, at the electronic device, a first pose of the electronic device based on the first image and pose data captured from one or more pose sensors during a first time period;
   identifying a transformation between the first pose and a current pose of the electronic device based on the pose data;
   adjusting a first pose of the AR object based on the identified transformation to generate an updated first combined image; and
   displaying, at a display of the electronic device, the updated first combined image.

2. The method of claim 1, wherein combining the first image with the AR object comprises:
   rendering, at the processor, the first image;
   rendering, at the processor, the AR object over the first image; and
   rendering, at the processor, the foreground pixels over the AR object to occlude at least a portion of the AR object.

3. The method of claim 1, further comprising:
   generating, at the processor, a virtual environment to model the real environment of the electronic device;
   identifying an initial relationship between the first pose and an initial pose of the AR object in the virtual environment;
   identifying, at the electronic device, the current pose of the electronic device based on a second image captured during a second time period following the first time period and pose data captured from the one or more pose sensors during the second time period; and
   combining the second captured image with the AR object to generate the updated combined image, comprising rendering the AR object in the second combined image at a position in the second combined image corresponding to the identified current pose for the AR object, wherein adjusting the first pose of the AR object is further based on applying a transformation to the initial pose of the AR object in the virtual environment corresponding to a transformation between the current pose and the first pose of the electronic device to identify a current pose for the AR object.

4. The method of claim 3, further comprising limiting the corresponding transformation to at least one of a threshold velocity and a threshold rotation.

5. The method of claim 3, further comprising:
   in response to identifying that the pose sensors have lost track of the pose of the electronic device, locking the pose of the electronic device to a most recent pose before tracking was lost; and
   in response to detecting that the pose sensors have regained tracking and have continuously tracked the pose of the electronic device for a threshold period of time, setting the pose of the AR object such that the AR object is in the same location relative to a current pose of the electronic device as the AR object was located relative to the most recent pose.

6. The method of claim 3, wherein the pose sensors comprise one or more accelerometers and are further configured to generate pose data based on feature identification and matching, and further comprising:
   identifying the current pose of the AR object based on pose data generated by the one or more accelerometers and omitting pose data based on feature identification and matching in response to detecting that pose tracking based on feature identification and matching has been lost.

7. The method of claim 1, further comprising:
periodically updating a pose of the AR object in the first combined image, comprising:
detecting a largest face in the first combined image; and
positioning the AR object in the first combined image proximate to the largest face.

8. The method of claim 7, further comprising:
interpolating the pose of the AR object to an updated pose over a predetermined time period, comprising accelerating the AR object from an initial pose toward the updated pose and decelerating the AR object as the AR object approaches the updated pose.

9. A method comprising:
capturing, at an image sensor of an electronic device, a first image of a real environment of the electronic device;
segmenting, at a processor of the electronic device, the first image into foreground pixels and background pixels;
rendering, at the processor, the first image;
rendering, at the processor, an augmented reality (AR) object over the first image;
rendering, at the processor, the foreground pixels of the first image over the AR object to generate a first combined image in which at least part of the AR object is occluded by the foreground pixels;
identifying, at the electronic device, a first pose of the electronic device based on the first image and pose data captured from one or more pose sensors during a first time period;
identifying a transformation between the first pose and a current pose of the electronic device based on the pose data;
adjusting a first pose of the AR object based on the identified transformation to generate an updated first combined image; and
displaying, at a display of the electronic device, the updated first combined image.

10. The method of claim 9, further comprising:
generating, at the processor, a virtual environment to model the real environment of the electronic device;
identifying an initial relationship between the first pose and an initial pose of the AR object in the virtual environment;
estimating, at the electronic device, the current pose of the electronic device based on a second image captured during a second time period following the first time period and pose data captured from the one or more pose sensors during the second time period; and
combining the second captured image with the AR object to generate the updated combined image, comprising rendering the AR object in the second combined image at a position in the second combined image corresponding to the identified current pose for the AR object, wherein
adjusting the first pose of the AR object is further based on applying a transformation to the initial pose of the AR object in the virtual environment corresponding to a transformation between the current pose and the first pose of the electronic device to identify a current pose for the AR object.

11. The method of claim 10, further comprising limiting the corresponding transformation to at least one of a threshold velocity and a threshold rotation.

12. The method of claim 10, further comprising:
in response to identifying that the pose sensors have lost track of the pose of the electronic device, locking the pose of the electronic device to a most recent pose before tracking was lost; and
in response to detecting that the pose sensors have regained tracking and have continuously tracked the pose of the electronic device for a threshold period of time, setting the pose of the AR object such that the AR object is in the same location relative to a current pose of the electronic device as the AR object was located relative to the most recent pose.

13. The method of claim 9, further comprising:
periodically updating a pose of the AR object in the first combined image, comprising:
detecting a largest face in the first combined image; and
positioning the AR object in the first combined image proximate to the largest face.

14. The method of claim 13, further comprising:
interpolating to an updated pose of the AR object over a predetermined time period,
comprising accelerating the AR object from an initial pose toward the updated pose and decelerating the AR object as the AR object approaches the updated pose.

15. An electronic device, comprising:
one or more pose sensors configured to capture pose data;
a processor configured to:
segment a first image of a real environment of the electronic device captured at a camera of the electronic device into foreground pixels and background pixels;
combine the first image with an augmented reality (AR) object based on the segmenting to generate a first combined image;
identify a first pose of the electronic device based on the first image and pose data captured during a first time period;
identify a transformation between the first pose and a current pose of the electronic device based on the pose data captured during a second time period;
adjust a first pose of the AR object based on the identified transformation to generate an updated first combined image; and
a display configured to display the updated first combined image.

16. The electronic device of claim 15, wherein the processor is further configured to:
render the first image;
render the AR object over the first image; and
render the foreground pixels over the AR object to occlude at least a portion of the AR object to generate the first combined image.

17. The electronic device of claim 15, wherein the processor is further configured to:
generate a virtual environment to model the real environment of the electronic device;
identify an initial relationship between the first pose and an initial pose of the AR object in the virtual environment;
estimate the current pose of the electronic device based on a second image captured during the second time period following the first time period and pose data captured during the second time period; and
combine the second captured image with the AR object to generate the updated combined image, comprising rendering the AR object in the second combined image at a position in the second combined image corresponding to the identified current pose for the AR object, wherein the processor is to adjust the first pose of the AR object further based on applying a transformation to the initial pose of the AR object in the virtual environment corresponding to a transformation between the current pose and the first pose of the electronic device to identify a current pose for the AR object.

18. The electronic device of claim 17, wherein the processor is further configured to limit the corresponding transformation to at least one of a threshold velocity and a threshold rotation.

19. The electronic device of claim 17, wherein the processor is further configured to:
   lock the pose of the electronic device to a most recent pose before tracking was lost in response to identifying that the pose sensors have lost track of the pose of the electronic device; and
   set the pose of the AR object such that the AR object is in the same location relative to a current pose of the electronic device as the AR object was located relative to the most recent pose in response to detecting that the pose sensors have regained tracking and have continuously tracked the pose of the electronic device for a threshold period of time.

20. The electronic device of claim 15, wherein the processor is further configured to:
   periodically update a pose of the AR object in the first combined image, comprising:
      detecting a largest face in the first combined image; and
      positioning the AR object in the first combined image proximate to the largest face.

* * * * *